US009297631B2

(12) United States Patent
Hagino et al.

(10) Patent No.: US 9,297,631 B2
(45) Date of Patent: Mar. 29, 2016

(54) SPHERICAL-FORM MEASURING APPARATUS

(71) Applicant: Mitutoyo Corporation, Kawasaki-shi, Kanagawa (JP)

(72) Inventors: Takeshi Hagino, Tsukuba (JP); Yuichiro Yokoyama, Tsukuba (JP); Yutaka Kuriyama, Tsukuba (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 167 days.

(21) Appl. No.: 14/079,782

(22) Filed: Nov. 14, 2013

(65) Prior Publication Data

US 2014/0130363 A1 May 15, 2014

(30) Foreign Application Priority Data

Nov. 15, 2012 (JP) .................................. 2012-251088

(51) Int. Cl.
*G01B 5/22* (2006.01)
*G01B 5/00* (2006.01)
*G01B 5/20* (2006.01)

(52) U.S. Cl.
CPC ................ *G01B 5/22* (2013.01); *G01B 5/0004* (2013.01); *G01B 5/201* (2013.01)

(58) Field of Classification Search
CPC .................................. G01B 5/22; G01B 5/0004
USPC .................................................... 33/502, 503
See application file for complete search history.

(56) References Cited

U.S. PATENT DOCUMENTS

| 4,414,748 | A * | 11/1983 | Gauler et al. ................... 33/573 |
| 4,492,036 | A * | 1/1985 | Beckwith, Jr. ................... 33/613 |
| 4,731,934 | A * | 3/1988 | Barnaby et al. ................. 33/504 |
| 8,356,417 | B2 * | 1/2013 | Hagino et al. ................... 33/553 |
| 8,869,601 | B2 * | 10/2014 | Yamamoto et al. ............. 73/105 |
| 2002/0148275 | A1 | 10/2002 | Abbe |

(Continued)

FOREIGN PATENT DOCUMENTS

DE 102008028986 A1 12/2009
EP 1467175 10/2004

(Continued)

OTHER PUBLICATIONS

Partial European Search Report, Application No. 13192997, dated Feb. 6, 2014, 6 pages.

(Continued)

*Primary Examiner* — Christopher Fulton
(74) *Attorney, Agent, or Firm* — Rankin, Hill & Clark LLP

(57) ABSTRACT

A spherical-form measuring apparatus includes a turntable 5, a holding unit 10 for holding the sphere 20, and a probe 6 for measuring a contour of a sphere part 22 of the sphere 20. The holding unit 10 includes a base part 12, a vertical holding part 14 and an inclined holding part 16 which are placed at separate positions on the base part 12. The vertical holding part 14 holds the stem part 24 of the sphere 20 with it set in a direction perpendicular to the turntable 5. The inclined holding part 16 holds the stem part 24 with it set in a direction at an angle. The vertical and inclined holding part 14, 16 are disposed such that their axial lines meet at an intersection point P and such that the distance from the point P to the vertical holding part 14 agrees with the distance from the point P to the inclined holding part 16.

5 Claims, 5 Drawing Sheets

(56) References Cited

U.S. PATENT DOCUMENTS

| | | |
|---|---|---|
| 2002/0189319 A1 | 12/2002 | Abbe |
| 2004/0200085 A1 | 10/2004 | Sakata et al. |
| 2005/0066534 A1* | 3/2005 | Matsuda .................. 33/502 |
| 2006/0201010 A1* | 9/2006 | Maier et al. .............. 33/502 |
| 2011/0173830 A1 | 7/2011 | Hagino et al. |
| 2014/0109419 A1* | 4/2014 | Shindo et al. ............ 33/502 |
| 2014/0130362 A1* | 5/2014 | Ishikawa et al. ......... 33/503 |
| 2014/0130363 A1* | 5/2014 | Hagino et al. ........... 33/503 |
| 2014/0345359 A1* | 11/2014 | Somerville ............. 73/1.79 |
| 2015/0052768 A1* | 2/2015 | Wimmer .................. 33/503 |
| 2015/0052769 A1* | 2/2015 | Noda et al. .............. 33/503 |

FOREIGN PATENT DOCUMENTS

| | | |
|---|---|---|
| JP | 2002-328018 | 11/2002 |
| JP | 2010-286363 | 12/2010 |
| JP | 2012-063338 | 3/2012 |
| WO | 2009/152962 A2 | 12/2009 |

OTHER PUBLICATIONS

European Search Report dated May 13, 2014, 9 pages.

* cited by examiner

SPHERICAL-FORM MEASURING APPARATUS

RELATED APPLICATIONS

This application claims the priority of Japanese Patent Application No. 2012-251088 filed on Nov. 15, 2012, which are incorporated herein by reference.

FIELD OF THE INVENTION

The present invention relates to spherical-form measuring apparatuses, and more specifically, to an improvement of a means for holding a sphere to be measured.

BACKGROUND OF THE INVENTION

Spherical-form measuring apparatuses for measuring sphericity, that is, form deviations from a perfect sphere, have been conventionally known. For example, Patent Literature 1 includes a spherical-form measuring apparatus for measuring the contour form of a sphere in a cross section cut through a given plane passing through the center of the sphere (referred to as the "form of a great circle" of the sphere). The spherical-form measuring apparatus in Patent Literature 1 uses a general roundness measuring machine and allows efficient sphericity measurement conforming to the Japanese Industrial Standard JIS B 1501 (2009) "Rolling bearings—Balls".

Known as one spherical standard is a reference sphere that includes a stem part and a sphere part. The reference sphere is used in three-dimensional measuring machines and the like (refer to Patent Literature 2). Three-dimensional measuring machines and the like often refer to the contour form of the sphere part of the reference sphere in a cross section cut through a plane which passes through the center of the sphere part and is perpendicular to the central line of the stem part (referred to as the "form of the equatorial circle" of the sphere part). For example, Patent Literature 2 includes a description that five measuring points, including four points at equal intervals of 90 degrees on the equatorial line and one at the north pole, are often used for measuring a sphere, and the five measuring points are used to estimate four parameters representing the center coordinates and diameter of the sphere by the least-squares method. The form of the equatorial circle of the sphere part is often referred to in estimation of the center coordinates of the sphere part of the reference sphere. If the form of the equatorial circle can be measured in a process of measuring the sphericity of the reference sphere by using the spherical-form measuring apparatus in Patent Literature 1, the measurement efficiency can be improved further.

FIG. 8 is a perspective view showing the overall structure of a spherical-form measuring apparatus 9 in Patent Literature 1. FIG. 9 is an enlarged view of a reference sphere 20 held in a holding unit 90 of the measuring apparatus 9 and the vicinity thereof. The holding unit 90 is disposed on a turntable 5 of the measuring apparatus 9.

As shown in FIG. 8, a slider 3 which can move in the Z direction is provided on a column 2 standing upright on a base 8 of the measuring apparatus 9. The slider 3 has a crank arm 4 which can move in the X direction. A probe 6 is secured to one end of the arm 4. The probe 6 has a stylus that is held so as to swing freely and detects the amount of displacement of the tip of the stylus. The slider 3 and the arm 4 can translate the probe 6 to a position where the tip of the stylus comes into contact with a sphere part 22 of a reference sphere 20.

The holding unit 90 includes a main part 92 and an inclined rotational holding part 94, as shown in FIG. 9. The main part 92 has an inclined face 93, and the inclined rotational holding part 94 is disposed rotatably on the inclined face 93. The surface of the inclined rotational holding part 94 has a hole formed along the rotational axis. A stem part 24 of the reference sphere 20 is held at an angle with respect to the surface of the table with its end inserted into the hole. When the inclined rotational holding part 94 rotates around its rotational axis while holding the reference sphere 20, the sphere part 22 of the reference sphere 20 rotates around the central line of the stem part 24. Suppose here that the angle formed between the central line of the stem part 24 of the held reference sphere 20 and the surface of the table is θ. The angle θ is set within a range of ±5 degrees with respect to an angle which has a sine value of $1/\sqrt{3}$ (1 divided by the square root of 3). In other words, the attitude of the inclined rotational holding part 94 with respect to the holding unit 90 is determined to obtain the angle θ.

With alignment controls 7 on the turntable 5, the position and attitude of the top of the turntable 5 can be adjusted so that the center of the sphere part 22 of the reference sphere 20 is aligned to the rotational axis of the turntable 5.

When the turntable 5 turns the holding unit 90 with the tip of the probe 6 kept in contact with the sphere part 22, the contour form of a great circle C1 of the sphere part 22 is detected as displacements of the stylus, and the form data of the great circle C1 can be obtained in accordance with the displacements. The sphere part 22 can be turned in steps of 120 degrees around the central line of the stem part 24 of the reference sphere 20. By measuring the contour form at each rotation step, the contour forms of the sphere part 22 in cross sections cut through three planes which pass through the center of the sphere part 22 and which are roughly perpendicular to one another, that is, the forms of three great circles, can be measured.

PATENT LITERATURE

Patent Literature 1: Japanese Unexamined Patent Application Publication No. 2012-063338

Patent Literature 2: Japanese Unexamined Patent Application Publication No. 2002-328018 (paragraph 0041)

DISCLOSURE OF THE INVENTION

Problem to be Solved by the Invention

Patent Literature 1, however, does not include a specific description of measurement of the form of the equatorial circle of the sphere part. The forms of three great circles of the sphere part can be measured in the measurement process described above, but the great circles do not include the equatorial circle of the sphere part.

When the form of the equatorial circle of the sphere part is measured with the central line of the stem part of the reference sphere aligned to the rotational axis of the turntable of the measuring apparatus in Patent Literature 1, that is, with the reference sphere placed with the stem part set vertically, the inventors of the present invention thought that attention should be paid to the following points. If a component for setting the stem part of the reference sphere vertically is added to the holding unit in Patent Literature 1, space must be left between the holding unit and the probe both when the stem part of the reference sphere is placed at an angle and when the stem part is placed vertically.

If interference cannot be avoided, separate holding units may be prepared for the measurement of the forms of three great circles of the sphere part and for the measurement of the form of the equatorial circle of the sphere part. By using the separate holding units, it may become possible to avoid interference. The holding units, however, should be replaced when measurement is switched between the great-circle form measurement and the equatorial-circle form measurement. The replacement would also require removal and replacement of the reference sphere, making the measurement procedure much more complicated.

General roundness measuring machines include movable components such as a turntable, a slider, and an arm, and their movement errors will affect measured values. To avoid the effects of these errors and to ensure a high measuring accuracy, a reversal measurement method, a multi-step method, and the like are used so that the roundness measuring machine can self-calibrate to correct the movement errors.

The movement errors, however, vary with the distance between the rotational axis of the turntable and the surface of the sphere to be measured or the distance between the top surface of the table and the surface of the sphere part. With the reference sphere, the height from the top surface of the table to the sphere part would depend on whether the stem part is positioned vertically or at an angle. The horizontal position of the sphere part would also be affected by a change in the attitude. Accordingly, the heights and horizontal positions of the sphere part should be adjusted to match both when the stem part of the reference sphere is positioned vertically and when the stem part is positioned at an angle.

If the height depends on the attitude of the reference sphere, an individual correction value must be obtained in advance and a correction should be made later. To cope with various attitudes, a great number of correction values must be obtained and managed.

In view of the problems described above, an object of the present invention is to improve the functions of the conventional spherical-form measuring apparatuses and to provide a spherical-form measuring apparatus in which the attitude of the sphere to be measured, including a sphere part and a stem part, can be easily changed among several types of attitudes by a single holding unit when the form of the sphere part is measured, and movement errors that could occur depending on the attitude in measurement can be corrected efficiently. In other words, an object of the present invention is to provide a spherical-form measuring apparatus that is easy to use and that has a high measuring accuracy.

Means to Solve the Problem

To solve the above-mentioned problem, the present invention provides a spherical-form measuring apparatus which measures a sphere that includes a sphere part and a stem part having a central line passing through the center of the sphere part, and includes a table, a holding unit placed on the table, for holding the sphere to be measured, and a probe for measuring the contour form of the sphere part in a plane parallel to the table.

The holding unit includes a base part which is placed on the table and a vertical holding part and an inclined holding part which are placed at separate positions on the base part. The vertical holding part holds the end of the stem part with the stem part set in a direction perpendicular to the surface of the table. The inclined holding part holds the end of the stem part with the stem part set in a direction at an angle with respect to the surface of the table.

The vertical holding part and the inclined holding part are disposed such that axial lines of the vertical holding part and the inclined holding part meet at a single intersection point and such that the distance from the intersection point to the vertical holding part agrees with the distance from the intersection point to the inclined holding part.

It is preferred that the holding unit further include a sliding adjustment part that slides at least one of the vertical holding part and the inclined holding part in a direction parallel to the surface of the table and in a direction such that the vertical holding part and the inclined holding part become closer to each other or farther away from each other.

It is preferred that the holding unit further include a height adjustment part that moves the vertical holding part in a direction perpendicular to the surface of the table.

It is preferred that the holding unit further include an angle adjustment part which adjusts the angle of inclination of the inclined holding part with respect to the base part such that the angle formed by the axial direction at the angle set by the inclined holding part and the surface of the table varies continuously.

A spherical-form measuring apparatus according to the present invention measures a sphere that includes a sphere part and a stem part having a central line passing through the center of the sphere part, and includes a table, a holding unit placed on the table, for holding the sphere to be measured, and a probe for measuring the contour form of the sphere part in a plane parallel to the table.

The holding unit includes a base part which is placed on the table, a holding part which holds the end of the stem part of the sphere to be measured with the stem part set in a given direction, and a position switching part which switches the position of the holding part between a vertical holding position and an inclined holding position of the base part.

When the position switching part switches the holding part to the vertical holding position, the given direction set by the holding unit is perpendicular to the surface of the table. When the position switching part switches the holding part to the inclined holding position, the given direction set by the holding part is inclined with respect to the surface of the table.

The axial lines in the different holding positions of the holding part form a single intersection point, and the distance between the intersection point and the holding part is maintained even after the position of the holding part is switched.

It is preferred that the position switching part be configured to turn 180 degrees with respect to the base part, the rotational axis of the position switching part be aligned with a bisector of an angle formed between the axial line in the vertical holding position and the axial line in the inclined holding position, and the position of the holding part be switched between the vertical holding position and the inclined holding position of the base part by rotating the position switching part by 180 degrees.

Since the reference sphere is held vertically by the vertical holding unit or by the holding part switched to the vertical holding position by the position switching part, the form of the sphere part on the equatorial circle can be measured. Since the reference sphere is held at an angle by the inclined holding unit or by the holding part switched to the inclined holding position by the position switching part, the form of the sphere part on a great circle can be measured. The center of the sphere part of the reference sphere with respect to the table can be maintained in the same horizontal position at the same height regardless of the attitude of the reference sphere. Accordingly, a common correction amount can be used to correct movement errors in form measurement in both attitudes. It is possible to smoothly switch between the two attitudes.

In form measurement of the sphere part of the sphere to be measured, the sphere to be measured can be easily switched among a plurality of attitudes by a single holding unit, and movement errors occurring in measurement in different attitudes can be corrected efficiently by using the common correction amount. Therefore, a spherical-form measuring apparatus that is easy to use and that has a high measuring accuracy can be provided.

BEST MODE FOR CARRYING OUT THE INVENTION

Preferred embodiments of the present invention will be described with reference to the drawings.

First Embodiment

Figure 1:
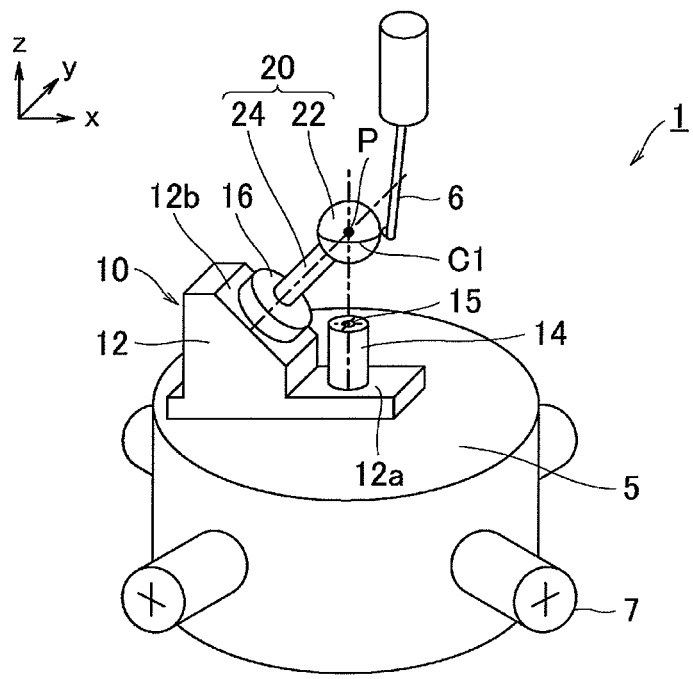
FIG. 1 is a perspective view of a roundness measuring machine in a first embodiment of the present invention, with a reference sphere held at an angle.
Figure 8:
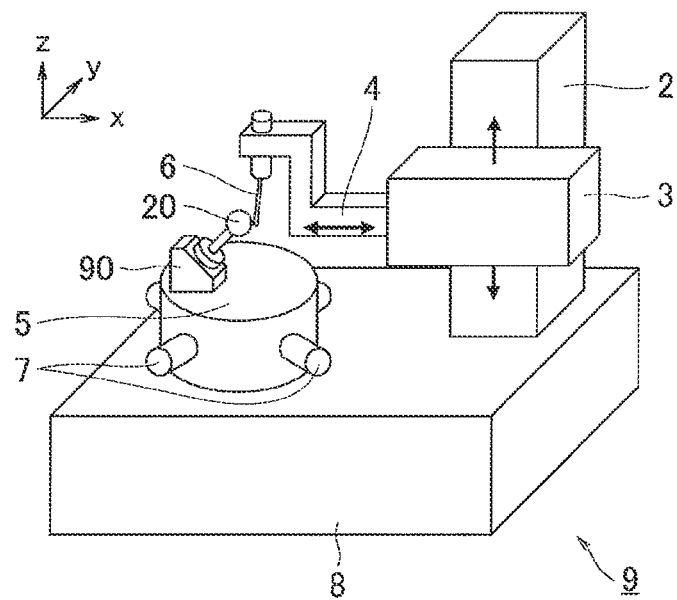
FIG. 8 is a perspective view showing the entire structure of a conventional roundness measuring machine.
Figure 9:
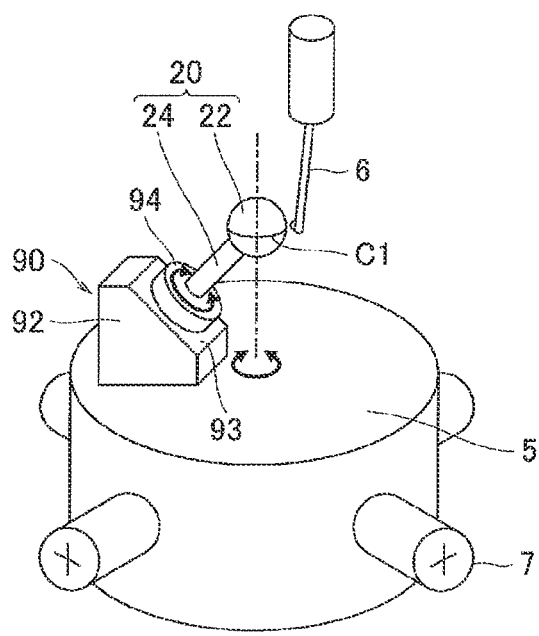
FIG. 9 is an enlarged view of a holding unit of the roundness measuring machine shown in FIG. 8 and the vicinity thereof.

FIG. 1 is an enlarged view of a holding unit and the vicinity thereof of a roundness measuring machine 1 according to the present invention, which is an apparatus for measuring form deviations of a sphere with reference to a perfect sphere (roundness). The roundness measuring machine 1 differs from the conventional measuring machine 9 shown in FIGS. 8 and 9 in that a holding unit 10 that can hold a reference sphere 20 in two different attitudes is provided. The basic components, such as a column 2, a slider 3, an arm 4, a turntable 5, and a probe 6, and their configurations are the same as those shown in FIGS. 8 and 9. The probe 6 may be a contact probe or a non-contact probe, such as a laser probe.
Structure of Holding Unit The holding unit 10 includes three major components: a base part 12, a vertical holding part 14, and an inclined rotational holding part 16. The base part 12 may be a combination of a horizontal holding plate and a main part (same as the main part 92 shown in FIG. 9) fixed thereon, as shown in FIG. 1. The base part 12 has a horizontal face 12a and an inclined face 12b. The two faces 12a and 12b are provided in such positions that the normal to the horizontal face 12a and the normal to the inclined face 12b meet at a single point (intersection point P). As described later, the intersection point P serves as the center of a sphere part 22 of the reference sphere 20 to be held.

The vertical holding part 14 has an almost cylindrical shape and stands upright on the horizontal face 12a. The central line of the vertical holding part 14 is aligned with the normal to the horizontal face 12a. The vertical holding part 14 has a hole 15 (FIG. 1) formed along the central line at its top face. When a projected part at one end of a stem part 24 of the reference sphere 20 is inserted into the hole 15 of the vertical holding part 14, the reference sphere 20 is held in a vertical attitude with respect to the surface of the table.

The inclined rotational holding part 16 is rotatably mounted on the inclined face 12b. The rotational axis of the inclined rotational holding part 16 is aligned with the normal to the inclined face 12b. The inclined rotational holding part 16 has a hole 17 (FIG. 2) formed along the rotational axis at its face. When the projected part at one end of the stem part 24 of the reference sphere 20 is inserted into the hole 17 of the inclined rotational holding part 16, the reference sphere 20 is held at an angle with respect to the surface of the table. By adjusting the position or attitude of the holding unit 10 on the surface of the table, the center of the sphere part 22 of the reference sphere 20 is aligned with the rotational axis of the turntable 5. The other configuration and functions of the inclined rotational holding part 16, concerning the angle θ formed between the central line of the stem part 24 of the held reference sphere 20 and the surface of the table and the like, are the same as those of the inclined rotational holding part 94 in FIG. 9.

Figure 2:
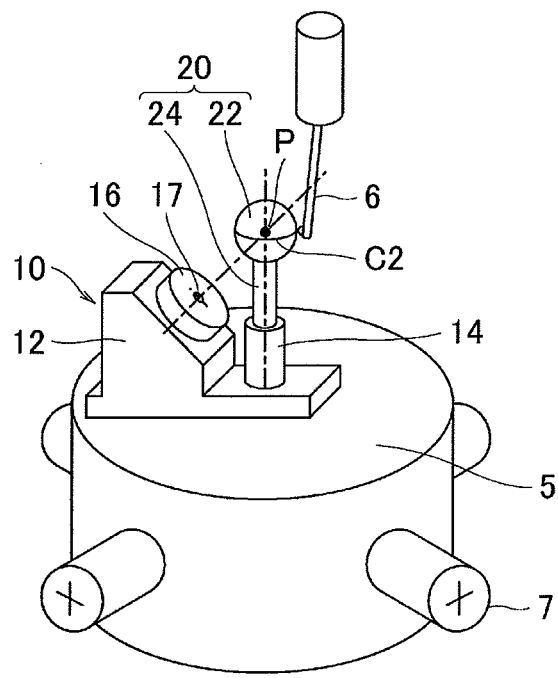
FIG. 2 shows the measuring machine shown in FIG. 1, with the reference sphere held vertically.

The vertical holding part 14 is positioned on the horizontal face 12a so that the central line of the vertical holding part 14 meets the rotational axis of the inclined rotational holding part 16 at a single point (intersection point P). The height (Z coordinate) of the top face of the vertical holding part 14 is determined so that the distance between the intersection point P and the hole 17 in the inclined rotational holding part 16 agrees with the distance between the intersection point P and the hole 15 in the vertical holding part 14. Therefore, when the reference sphere 20 is switched from the inclined holding state as shown in FIG. 1 to the vertical holding state as shown in FIG. 2, since the position of the holding unit 10 on the surface of the table is kept unchanged, the center of the sphere part 22 of the reference sphere 20 can be aligned to the rotational axis of the turntable 5 without special adjustment.

The change in the holding state does not change the position of the sphere part 22 of the reference sphere 20 either. That is, the holding state of the reference sphere 20 does not affect the height (Z coordinate) of the center of the sphere part 22 or the horizontal position (X and Y coordinates) of the center of the sphere part 22 in a plane parallel to the horizontal face 12a. The central position of the sphere part 22 is maintained even after the attitude of the reference sphere 20 is changed.

Since the stem part 24 of the reference sphere 20 extends below the sphere part 22 in any attitude, both the vertical holding part 14 and the inclined rotational holding part 16 lie below the sphere part 22. Accordingly, when the turntable 5 is rotated in contour measurement by the probe 6, space is maintained between the probe 6 and the holding unit 10.

A procedure for measuring the contour of the reference sphere 20 by using the roundness measuring machine 1 will be described next.

The contour of the sphere part 22 is measured as described below, regardless of the attitude of the reference sphere 20. The probe 6 is first moved by the slider 3 and the arm 4 toward the reference sphere 20 held in position until the tip of the probe 6 comes into contact with the sphere part 22. The contact position should be on a line of intersection of the surface of the sphere part 22 with a plane which passes through the center of the sphere part 22 and is parallel to the horizontal face 12a. With the tip of the probe 6 held in contact with the sphere part 22, the turntable 5 is rotated, and displacements of the tip of the probe 6 are detected, the displacements being associated with the rotation positions of the turntable 5. On the basis of the detected values, the contour form of the sphere part 22 along the line of intersection can be calculated.

Contour measurement corresponding to the attitude of the reference sphere 20 is executed as described below.

Form Measurement of Three Great Circles

The measuring method is the same as described in Patent Literature 1. As shown in FIG. 1, the stem part 24 of the reference sphere 20 is inserted into the hole 17 in the inclined rotational holding part 16 of the holding unit 10 in this embodiment to let the holding unit 10 hold the reference sphere 20 at an angle. The sphere part 22 of the reference sphere 20 is rotated around the central line of the stem part 24 in steps of 120 degrees. At each rotation step, contour measurement is executed by using the probe 6 and the turntable 5. Then, the forms of contours of the sphere part 22 in cross sections cut through three planes which pass through the center of the sphere part 22 and intersect each other almost orthogonally, that is to say, the forms of three great circles (C1, for example), can be obtained.

Form Measurement of Equatorial Circle

As shown in FIG. 2, the stem part 24 of the reference sphere 20 is inserted into the hole 15 in the vertical holding part 14 of the holding unit 10 to let the holding unit 10 hold the reference sphere 20 vertically. In this holding state, contour measurement is executed by using the probe 6 and the turntable 5. Then, the contour form of the sphere part 22 in a cross section cut through a plane which passes through the center of the sphere part 22 and which is perpendicular to the central line of the stem part 24, that is to say, the form of the equatorial circle (C2) of the sphere part, can be obtained.

In this embodiment, when the attitude of the reference sphere 20 is changed successively for contour measurement, the measurer just has to remove the reference sphere 20 from one holding part of the holding unit 10 and insert the stem part 24 into the hole in the other holding part. After measuring the contour of either a great circle or the equatorial circle, the next measurement can be started smoothly.

Since the roundness measuring machine 1 is configured as described above, the procedure for changing from the setup for measuring the forms of three great circles of the sphere part 22 of the reference sphere 20 to the setup for measuring the form of the equatorial circle of the sphere part 22 is simplified greatly. The position (including the height) of the center of the sphere part 22 of the reference sphere 20 with respect to the turntable 5 does not change even when the attitude of the reference sphere 20 is changed. Accordingly, a common correction amount can be used to correct a movement error in both types of measurement. As a result, the forms of three great circles and the form of the equatorial circle of the sphere part 22 can be measured accurately with a small number of steps.

Second Embodiment

Figure 3:
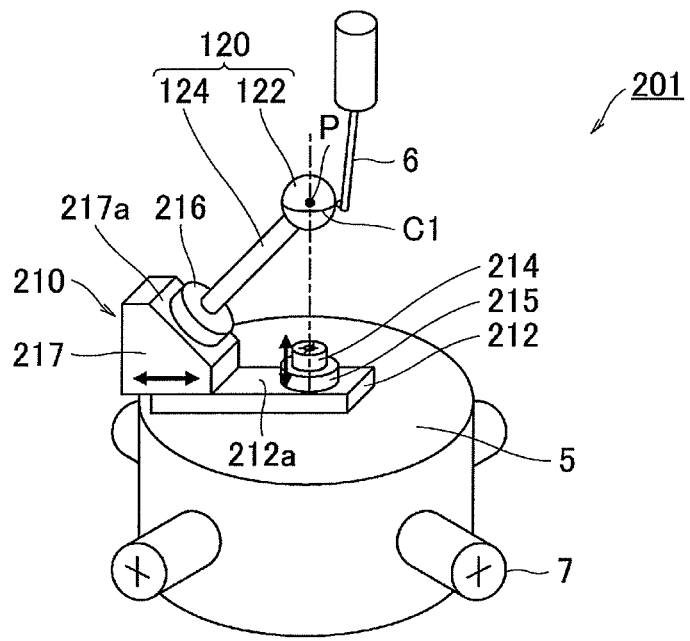
FIG. 3 is a perspective view showing a roundness measuring machine in a second embodiment, with a reference sphere of a given length held at an angle.
Figure 4:
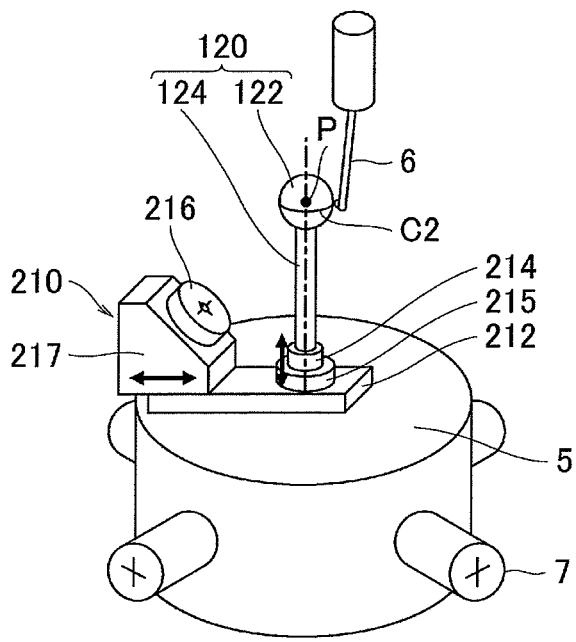
FIG. 4 shows the reference sphere of the given length shown in FIG. 3 held vertically.

A roundness measuring machine 201 according to a second embodiment will be described with reference to FIGS. 3 and 4. Components identical to the components in the holding unit 10 of the first embodiment will be denoted by the same reference numerals plus 200. FIG. 3 shows a reference sphere 120 held at an angle. FIG. 4 shows the reference sphere 120 held vertically.

A holding unit 210 in the roundness measuring machine 201 in this embodiment differs from the holding unit 10 shown in FIG. 1 in that a positioning function is added to cope with reference spheres (120, for example) in different sizes. Here, "positioning" includes at least one of positioning of the reference sphere 120 in a direction (horizontal direction) parallel to the surface of the turntable 5 and positioning in a vertical direction (direction of height) perpendicular to the surface of the turntable 5.

The holding unit 210 includes a base part 212, a vertical holding part 214, a height adjustment part 215, an inclined rotational holding part 216, and a sliding adjustment part 217. The base part 212 is like a plate and has a horizontal face 212a. On the horizontal face 212a, the height adjustment part 215 and the sliding adjustment part 217 are placed at separate positions. The height adjustment part 215 adjusts the height (position in the Z direction) of the vertical holding part 214. For example, the height adjustment part 215 may have an internal thread in a direction perpendicular to the horizontal face 212a, and the vertical holding part 214 may have an external thread to engage with the internal thread, and the height is adjusted by screwing the vertical holding part 214.

The sliding adjustment part 217 is mounted to slide parallel to the horizontal face 212a. The sliding adjustment part 217 slides in directions to become closer to and farther away from the vertical holding part 214. The sliding adjustment part 217 has an inclined face 217a, and the inclined rotational holding part 216 is mounted on the inclined face 217a in the same way as the inclined rotational holding part 16 in the first embodiment. In the holding unit 210 shown in FIGS. 3 and 4, the vertical holding part 214 has a height adjustment function, and the inclined rotational holding part 216 has a sliding adjustment function. The relationship may be inverted: The vertical holding part 214 may have a sliding adjustment part, and the inclined rotational holding part 216 may have a height adjustment part. Either the vertical holding part 214 or the inclined rotational holding part 216 may have both the height adjustment part and the sliding adjustment part.

The roundness measuring machine 201 in this embodiment differs from the measuring machine 1 in the first embodiment in that a function to measure reference spheres of different sizes is provided. Generally, when the contour form of the sphere part 22 is measured as the turntable 5 rotates, the sphere part 22 has to be roughly aligned with the rotational axis of the turntable 5. In the holding unit 10 shown in FIG. 1, the relative positional relationship between the vertical holding part 14 and the inclined rotational holding part 16 is fixed, and the angle formed between the surface of the table and the central line of the stem part 24 of the reference sphere held at an angle is also fixed. If the length from the end of the stem part 24 to the center of the sphere part 22 is specified to set the center of the sphere part 22 of the held reference sphere at the unique intersection point P of the holding unit 10, there will be no problem. If a reference sphere of a different length, such as a reference sphere having a stem part of a different length or a reference sphere having a sphere part with a different diameter is measured, the center of the sphere part of the reference sphere held at an angle by the holding unit 10 would not be aligned with the rotational axis of the turntable 5. In addition, the height of the center of the sphere part held at an angle would not agree with that held vertically.

In contrast, since the holding unit 210 in this embodiment includes the two adjustment mechanisms 215 and 217, reference spheres 120 of different sizes can be measured. When the reference sphere is held at an angle, as shown in FIG. 3, the sliding adjustment part 217 allows the horizontal position of the inclined rotational holding part 216 to be adjusted. The center of the sphere part 122 can be aligned with the rotational axis of the turntable 5 by moving the sliding adjustment part 217 by the amount of misalignment of the center of the sphere part 122 from the rotational axis of the turntable 5. Misalignment of the center of the sphere part 122 from the rotational axis of the turntable 5 that could occur in an inclined state can be eliminated by moving the inclined rotational holding part 216 by the sliding adjustment part 217 in a radial direction of the turntable 5.

When the reference sphere 120 is held vertically, as shown in FIG. 4, the height of the vertical holding part 214 can be adjusted by the height adjustment part 215. The center of the sphere part 122 held vertically can be adjusted to the same height as the center of the sphere part 122 held at an angle. A difference in height of the center between the sphere part 122 held vertically and the sphere part 122 held at an angle is eliminated by providing the height adjustment part 215.

Measuring Procedure

An example measuring procedure using the roundness measuring machine 201 will now be described in detail.

The reference sphere 120 is first held vertically by the holding unit 210, as shown in FIG. 4. The tip of the probe 6 is brought into contact with the sphere part 122, and the probe 6 is moved appropriately, maintaining the contact state. In accordance with detected values, the coordinates of the center position of the sphere part 122 are roughly calculated. Then, the length from the end of the stem part 124 to the center of the sphere part 122 of the reference sphere 120 is obtained.

The amount by which the sliding adjustment part 217 should be moved is uniquely determined by the obtained length of the reference sphere 120. The position of the sliding adjustment part 217 is adjusted in accordance with the determined amount of movement. The reference sphere 120 is held at an angle by the holding unit 210 positioned as described above, and the form of a great circle C1 is measured. The form of a different great circle can be measured at each different position by turning the stem part 124 with the inclined rotational holding part 216.

Next, the amount by which the height adjustment part 215 should be moved is determined by the obtained length of the reference sphere 120. The amount of movement of the height adjustment part 215 that can bring the center of the sphere part 122 of the reference sphere 120 held at an angle and the center of the sphere part 122 held vertically into agreement with each other is uniquely determined. The height of the height adjustment part 215 is adjusted in accordance with the amount of movement. With the reference sphere 120 held vertically by the holding unit 210 positioned as described above, the form of the equatorial circle C2 is measured.

Since the amount of movement in the height direction can be obtained when the length of the reference sphere 120 is measured, it is more efficient to measure the form of the equatorial circle C2 in the vertical position before the attitude is inclined.

The position, including the height, of the center of the sphere part 122 of the reference sphere 120 with respect to the turntable 5 is now maintained regardless of the attitude of the reference sphere 120. Accordingly, a common correction amount can be used to correct movement errors in both types of measurement. Since the same holding unit 210 can be used to measure reference spheres 120 of different sizes, the procedure for changing from the attitude for measuring the form of the great circle C1 to the attitude for measuring the form of the equatorial circle C2 is greatly simplified. By adding the mechanisms 215 and 217 for adjusting the horizontal position and the height of the center of the reference sphere 120, the forms of three great circles and equatorial circle of the reference sphere can be measured highly accurately with a small number of steps even when the diameter of the sphere part or the length of the stem part of the reference sphere 120 is changed.

In a modification, the vertical holding part 214 is secured to the base part 212 and both the height adjustment part and the sliding adjustment part are provided for the inclined rotational holding part 216. A measuring procedure for this modification is as described below. The height adjustment part may move the inclined rotational holding part 216 along the axial line in the inclined direction or along the vertical axial line. First, the reference sphere 120 is held vertically, and the length of the reference sphere 120 and the form of the equatorial circle C2 are measured. In accordance with the length of the reference sphere 120, a height adjustment and a sliding adjustment are carried out together. Then, the form of the great circle C1 of the reference sphere 120 in the inclined state is measured. This procedure makes it possible to perform measurement with a reduced number of steps.

Third Embodiment

Figure 5:
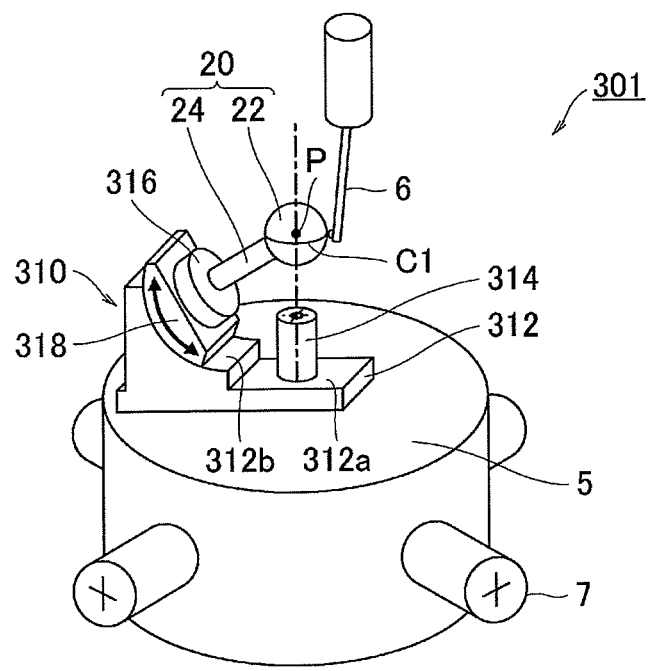
FIG. 5 is a perspective view of a roundness measuring machine in a third embodiment, with a reference sphere held at an angle in measurement of a given contour of the reference sphere.

A roundness measuring machine 301 in a third embodiment will be described with reference to FIG. 5. Components identical to the components in the holding unit 10 of the first embodiment will be denoted by the same reference numerals plus 300. FIG. 5 shows the reference sphere 20 held at an angle for measuring a given contour of the reference sphere 20.

A holding unit 310 in the measuring machine 301 shown in FIG. 5 differs from the holding unit 10 shown in FIG. 1 in that an angle adjustment function is provided to allow the form of a given great circle to be measured. Here, "angle adjustment" means adjustment of the angle of inclination of the stem part 24 of the reference sphere 20.

A base part 312 has a horizontal face 312a, on which a vertical holding part 314 is disposed, and a concave curved face 312b used as a guide face of an angle adjustment part 318. The form of the curved face 312b in a cross section cut through a plane determined by the direction of the rotational axis of the turntable 5 and the radial direction from the center of the table surface is a circular arc. The angle adjustment part 318 has a convex curved surface that fits the curved face 312b of the base part 312. An inclined rotational holding part 316 is mounted to the angle adjustment part 318. As the attitude of the angle adjustment part 318 changes while it is guided along the concave curved face 312b, the attitude of the inclined rotational holding part 316 changes accordingly, and the direction of inclination determined by the inclined rotational holding part 316 changes as well.

Patent Literature 1 includes the following suggestions. An angle of about 35 degrees is formed between the central line of the stem part 24 of the reference sphere 20 and the surface of the table, and the inclined rotational holding part 316 is rotated in steps of 120 degrees around its rotational axis. By performing normal contour measurement at each 120-degree position of rotation, the contour forms of three mutually perpendicular great circles can be measured. It is also possible that the contour form of the sphere part 22 in a cross section cut through a given plane passing through the center of the sphere part 22 can be measured by changing the setting of the angle formed between the stem part 24 and the surface of the table. In this embodiment, by disposing the angle adjustment part 318, the contour form in a given cross section, described in Patent Literature 1, can be measured easily.

It is preferred here that the center of the cross-sectional arc of the concave curved face 312b be brought to the intersection point P (point of intersection of the vertical axial line of the vertical holding part 314 and the inclined axial line of the inclined rotational holding part 316). If the cross-sectional form of the curved face 312b is an arc having the intersection point P as its center, a change in attitude of the angle adjustment part 318 does not move the center position of the sphere part 22, and the center position is kept at the intersection point P. By designing the guide face of the angle adjustment part 318 to have a circular-arc cross section having the sphere part 22 as its center (shape formed by cutting a cylindrical space having a central axis passing through the intersection point P in the base part 312), the horizontal position and height of the center of the sphere part 22 of the reference sphere 20 can be maintained even when the angle formed by the stem part 24 and the surface of the table changes. Accordingly, at any given-position, form of the reference sphere 20 can be measured highly accurately with a small number of steps.

A multifunctional holding unit may be configured by adding the height adjustment function and sliding adjustment function described in the second embodiment to the holding unit 310 in this embodiment.

Fourth Embodiment

Figure 6:
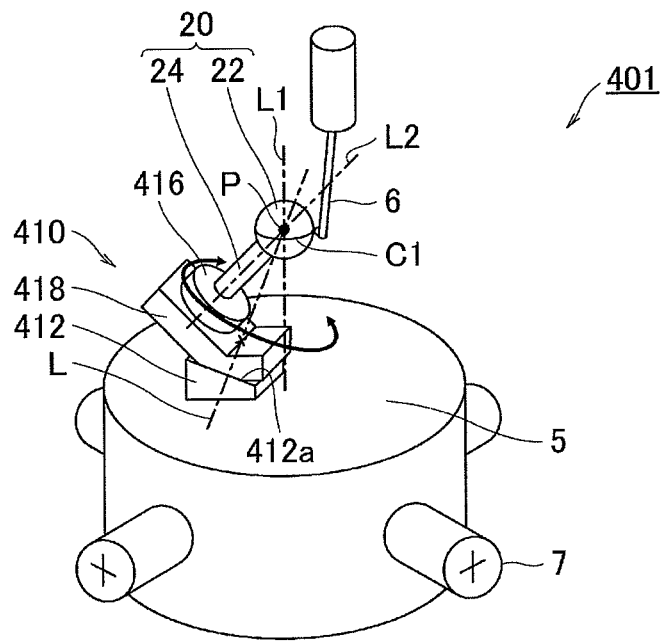
FIG. 6 is a perspective view showing a roundness measuring machine in a fourth embodiment, with a reference sphere switched to an inclined attitude.
Figure 7:
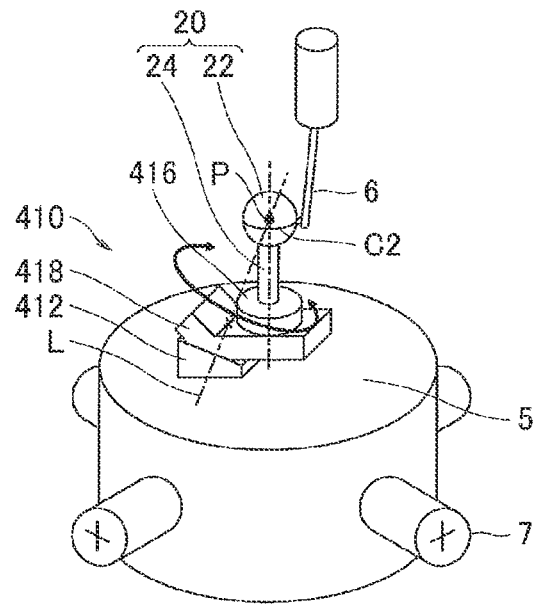
FIG. 7 shows the reference sphere shown in FIG. 6 switched to a vertical attitude.

A roundness measuring machine 401 according to a fourth embodiment will be described with reference to FIGS. 6 and 7. Components identical to the components in the holding unit 10 of the first embodiment will be denoted by the same reference numerals plus 400. FIG. 6 shows the reference sphere 20 switched to an inclined holding position. FIG. 7 shows the reference sphere 20 switched to a vertical holding position.

A holding unit 410 in the roundness measuring machine 401 of this embodiment differs from the holding unit 10 shown in FIG. 1 in that a position switching mechanism is provided. The holding unit 410 includes a base part 412, a rotational holding part 416, and a position switching part 418. The base part 412 is placed on the surface of the table and has an inclined face 412a, which is not parallel to the surface of the table.

The position switching part 418 is rotatably provided on the base part 412 so that it can rotate about an axis L perpendicular to the inclined face 412a. As the position switching part 418 rotates, the rotational holding part 416 is brought to a vertical holding position or an inclined holding position. The position switching part 418 rotates by 180 degrees at least.

The rotational holding part 416 holds the end of the stem part 24 of the reference sphere 20 with the stem part 24 set in a given direction. The rotational holding part 416 has the same configuration as the inclined rotational holding part 16 in the first embodiment. When the rotational holding part 416 is switched to the inclined holding position, as shown in FIG. 6, the given direction is an inclined direction with respect to the surface of the table, and the axial line L2 represents the inclined direction. When the position switching part 418 switches the rotational holding part 416 to the vertical holding position, as shown in FIG. 7, the given direction determined by the rotational holding part 416 is the direction perpendicular to the surface of the table, and the axial line L1 represents the perpendicular direction. The perpendicular axial line L1 and the inclined axial line L2 meet at a single point (intersection point P). The distance between the intersection point P and the rotational holding part 416 does not change even after the position of the rotational holding part 416 is switched. The rotational axis L is aligned with a bisector of an angle formed between the perpendicular axial line L1 in the vertical holding position and the inclined axial line L2 in the inclined holding position. The rotational axis L is referred to as a line of symmetry of the position switching part 418.

In the first to third embodiments, each time the attitude of the reference sphere 20 is changed to the inclined position or the vertical position, the reference sphere 20 must be removed from and replaced on the vertical holding part 14 or the inclined rotational holding part 16. With the holding unit 410 in this embodiment, the attitude of the reference sphere 20 can be switched between the inclined position and the vertical position just by turning the position switching part 418, without removing and replacing the reference sphere 20. The position switching part 418 described here rotates about the line of symmetry L, but the position switching part 418 need not always be a rotary mechanism. For example, a detachable mechanism may be provided such that the position switching part 418 can be removed from the base part 412 and can be replaced on the base part 412 after it is turned.

The embodiments described above use a turntable, but the measuring machine is not limited to the turntable type. The present invention can be applied to a measuring machine that has a fixed table and a detector moving around the sphere part 22 (rotary detector type), and the same advantages can be obtained.

The holding unit in each of the embodiments is used with its corresponding base part 12, 212, 312, or 412 placed on the turntable, and the attitude of the base part with respect to the turntable does not change. A fixed table may be used instead of the turntable, and the holding unit may have a rotary mechanism. For example, in FIG. 3, the base part 212 with the sliding adjustment part 217 and the height adjustment part 215 placed on it may rotate around the axial line of the vertical holding part 214. Likewise, in FIGS. 1, 5, and 6, the base parts 12, 312, and 412 may rotate around the axial line of the vertical holding part 14, the axial line of the vertical holding part 314, and the axial line L1 in FIG. 6, respectively.

EXPLANATION OF NUMERICAL REFERENCE 1, 201, 301, 401: Roundness measuring machine
2: Column
3: Slider
4: Crank arm
5: Turntable
6: Probe
10, 210, 310, 410: Holding unit
12, 212, 312, 412: Base part
14, 214, 314: Vertical holding part
16, 216, 316: Inclined rotational holding part
20, 120: Reference sphere
22, 122: Sphere part
24, 124: Stem part
215: Height adjustment part
217: Sliding adjustment part
318: Angle adjustment part
416: Rotational holding part
418: Position switching part

What is claimed is:

1. A spherical-form measuring apparatus which measures a sphere that includes a sphere part and a stem part having a central line passing through the center of the sphere part, comprising:
   a table;
   a holding unit placed on the table, for holding the sphere to be measured;
   and a probe for measuring the contour form of the sphere part in a plane parallel to the table;

wherein the holding unit includes,
a base part which is placed on the table, and
a vertical holding part and an inclined holding part which are placed at separate positions on the base part,
wherein the vertical holding part holds the end of the stem part with the stem part set in a direction perpendicular to the surface of the table,
wherein the inclined holding part holds the end of the stem part with the stem part set in a direction at an angle with respect to the surface of the table,
wherein the vertical holding part and the inclined holding part are disposed such that axial lines of the vertical holding part and the inclined holding part meet at a single intersection point and such that the distance from the intersection point to the vertical holding part agrees with the distance from the intersection point to the inclined holding part.

2. The apparatus according to claim 1, wherein the holding unit further includes a sliding adjustment part that slides at least one of the vertical holding part and the inclined holding part in a direction parallel to the surface of the table and in a direction such that the vertical holding part and the inclined holding part become closer to each other or farther away from each other.

3. The apparatus according to claim 1, wherein the holding unit further includes a height adjustment part that moves the vertical holding part in a direction perpendicular to the surface of the table.

4. The apparatus according to claim 1, wherein the holding unit further includes an angle adjustment part which adjusts the angle of inclination of the inclined holding part with respect to the base part such that the angle formed by the axial direction at the angle set by the inclined holding part and the surface of the table varies continuously.

5. A spherical-form measuring apparatus which measures a sphere that includes a sphere part and a stem part having a central line passing through the center of the sphere part, comprising:

a table;
a holding unit placed on the table, for holding the sphere to be measured;
and a probe for measuring the contour form of the sphere part in a plane parallel to the table;
wherein the holding unit includes,
a base part which is placed on the table,
a holding part which holds the end of the stem part of the sphere to be measured with the stem part set in a given direction, and
a position switching part which switches the position of the holding part between a vertical holding position and an inclined holding position of the base part,
wherein the given direction set by the holding part is perpendicular to the surface of the table, when the position switching part switches the holding part to the vertical holding position,
wherein the given direction set by the holding part is inclined with respect to the surface of the table, when the position switching part switches the holding part to the inclined holding position,
wherein axial lines of the stem part in the different holding positions of the holding part form a single intersection point,
wherein the distance between the intersection point and the holding part is maintained even after the position of the holding part is switched,
wherein the position switching part is configured to turn 180 degrees with respect to the base part,
wherein the rotational axis of the position switching part is aligned with a bisector of an angle formed between the axial line of the stem part in the vertical holding position and the axial line of the stem part in the inclined holding position, and
wherein the position of the holding part is switched between the vertical holding position and the inclined holding position of the base part by rotating the position switching part by 180 degrees.

* * * * *